(12) United States Patent
Kawamura et al.

(10) Patent No.: US 11,279,112 B2
(45) Date of Patent: Mar. 22, 2022

(54) COATING LAMINATED BODY AND METHOD FOR PRODUCING THE SAME

(71) Applicant: Hitachi, Ltd., Tokyo (JP)

(72) Inventors: Toshinori Kawamura, Tokyo (JP); Hiroshi Kanemoto, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 16/650,626

(22) PCT Filed: May 8, 2018

(86) PCT No.: PCT/JP2018/017692
§ 371 (c)(1),
(2) Date: Mar. 25, 2020

(87) PCT Pub. No.: WO2019/064672
PCT Pub. Date: Apr. 4, 2019

(65) Prior Publication Data
US 2020/0255965 A1    Aug. 13, 2020

(30) Foreign Application Priority Data

Sep. 27, 2017 (JP) ............................. JP2017-185614

(51) Int. Cl.
*B32B 15/01* (2006.01)
*C25D 5/14* (2006.01)
(Continued)

(52) U.S. Cl.
CPC .............. *B32B 15/01* (2013.01); *C25D 5/14* (2013.01); *C25D 5/50* (2013.01); *C25D 5/611* (2020.08);
(Continued)

(58) Field of Classification Search
CPC . C25D 5/14; C25D 5/50; C25D 5/611; C25D 5/617; C25D 3/562; B32B 15/01;
(Continued)

(56) References Cited

U.S. PATENT DOCUMENTS 5,587,248 A * 12/1996 Ohmura et al. .......... C25D 5/26
428/610
10,266,957 B2 * 4/2019 Sugawara .............. C25D 5/625
(Continued)

FOREIGN PATENT DOCUMENTS

CN    108396348 A  *  8/2018  ............... C25D 5/14
JP    59-50195 A       3/1984
(Continued)

OTHER PUBLICATIONS

Machine Translation of JPH 06-200382 (Year: 1992).*
(Continued)

*Primary Examiner* — Humera N. Sheikh
*Assistant Examiner* — John D Schneible
(74) *Attorney, Agent, or Firm* — Crowell & Moring LLP

(57) ABSTRACT

An object of the invention is to provide a coating laminated body in which coatings not containing hexavalent chromium which is an environmental concern material, and excellent in corrosion resistance and wear resistance are laminated on a base material, and to provide a method for producing the same. The coating laminated body according to the invention is a laminated body in which a multiple-layer coating is laminated on a base material. The multiple-layer coating includes: a plurality of layers of S-containing Ni alloy coatings; and a sulfur concentrated layer that is formed between the plurality of layers of S-containing Ni alloy coatings and has an S concentration higher than an S concentration of the S-containing Ni alloy coatings. Each of the plurality of layers of S-containing Ni alloy coatings has
(Continued)

a Ni concentration of 90% or more by mass, and a difference in Ni concentration between the coatings is within 1% by mass.

9 Claims, 6 Drawing Sheets

(51) Int. Cl.
*C25D 5/50* (2006.01)
*C25D 5/00* (2006.01)
*C25D 3/56* (2006.01)
*B32B 15/04* (2006.01)

(52) U.S. Cl.
CPC ............ *C25D 5/617* (2020.08); *B32B 15/04* (2013.01); *C25D 3/562* (2013.01); *Y10T 428/12049* (2015.01); *Y10T 428/12069* (2015.01); *Y10T 428/12076* (2015.01); *Y10T 428/12083* (2015.01); *Y10T 428/12118* (2015.01)

(58) Field of Classification Search
CPC ............. B32B 15/04; Y10T 428/12049; Y10T 428/12069; Y10T 428/12076; Y10T 428/12083; Y10T 428/12118
USPC ......................................................... 428/457
See application file for complete search history.

(56) References Cited

U.S. PATENT DOCUMENTS

| 2005/0196634 | A1* | 9/2005 | Abe | ........................... | C22C 9/00 |
| | | | | | 428/615 |
| 2008/0274373 | A1 | 11/2008 | Takahashi | | |
| 2017/0297673 | A1* | 10/2017 | Rice et al. | ................ | B64C 1/00 |

FOREIGN PATENT DOCUMENTS

| JP | 63-105990 A | 5/1988 |
| JP | 6-200382 A | 7/1994 |
| JP | 2001-279489 A | 10/2001 |
| WO | WO 2006/043507 A1 | 4/2006 |

OTHER PUBLICATIONS

Nickel Institute, "Nickel Plating Handbook", 2014, Nickel Institute, p. 5-78 (Year: 2014).*

Ron Parkinson, "Properties and applications of electroless nickel", Nickel Institute, p. 1-37 (Year: 1997).*

International Search Report (PCT/ISA/210) issued in PCT Application No. PCT/JP2018/017692 dated Jun. 26, 2018 with English translation (five pages0.

Japanese-language Written Opinion (PCT/ISA/237) issued in PCT Application No. PCT/JP2018/017692 dated Jun. 26, 2018 (four pages).

* cited by examiner

COATING LAMINATED BODY AND METHOD FOR PRODUCING THE SAME

TECHNICAL FIELD

The present invention relates to a coating laminated body in which a plurality of layers of coatings are laminated on a base material, and to a method for producing the same.

BACKGROUND ART

In recent years, there has been a growing tendency for various devices to be used under severe environmental conditions than before. For example, there are offshore wind power generation equipment, pipes and pumps used in seawater desalination equipment, and automobiles and construction equipment employed in a region where salt-air damage is obvious with a large amount of snow-melting agents dispersed therein.

In a metal component used in such a device, deterioration on surfaces of the metal component tends to occur due to composite factors such as corrosion or wear, which may lead to an increase in maintenance frequency of the device, and further shortening of lifetime of the device.

Currently, surface treatments using hexavalent chromium plating that is excellent in corrosion resistance and wear resistance are often employed for the metal component that easily deteriorates due to the above-described composite factors.

However, the hexavalent chromium is specified as an environmental high concern material in environmental regulations such as REACH regulations (Regulation of Registration, evaluation, authorization and Restriction of Chemicals, establishing a European Chemicals Agency) and wastewater regulations, and reducing the use thereof is desired in worldwide. In view of such a background, various surface treatment techniques have been proposed as plating techniques to replace the hexavalent chromium plating.

For example, PTL 1 discloses a multiple-layer Ni alloy plating coating, in which a plurality of Ni alloy plating coatings are formed on a surface of a material to be plated, each layer of Ni alloy plating coating contains an element selected from P, B, and S at different concentrations, and a potential relationship between adjacent Ni alloy plating coatings is provided such that a voltage of an outer-side Ni alloy plating coating is lower than a voltage of an inner-side Ni alloy plating coating by 30 mV or more.

PRIOR ART LITERATURE

Patent Literature

PTL 1: JP-A-63-105990

SUMMARY OF INVENTION

Technical Problem

The technique of PTL 1 is a multiple-layer Ni alloy plating coating aimed at improving corrosion resistance and productivity, and in order to develop a sacrificial anticorrosive effect due to an interlayer potential difference, a content amount of a metalloid element such as P in the plating coating of each layer is adjusted by changing current density in one plating bath. As a result, the hardness of each layer of the multiple-layer plating coating is different, and the wear resistance of the multiple-layer plating coating as a whole is considered to be not sufficient. That is, there is a demand for further improving the wear resistance of the coating.

In view of the above problem, an object of the invention is to provide a coating laminated body in which coatings not containing hexavalent chromium which is an environmental concern material and excellent in corrosion resistance and wear resistance are laminated on a base material, and to provide a method for producing the same.

Solution to Problem (I) According to an aspect of the invention, a coating laminated body includes a base material and a multiple-layer coating laminated on the base material. The multiple-layer coating includes: a plurality of layers of an S-containing Ni alloy coatings; and a sulfur concentrated layer that is formed between the plurality of layers of sulfur (S)-containing nickel (Ni) alloy coatings and has an S concentration higher than an S concentration of the S-containing Ni alloy coatings. Each of the plurality of layers of S-containing Ni alloy coatings has a Ni concentration of 90% or more by mass, and a difference in the Ni concentration between the coatings is within 1% by mass.

According to the invention, the following improvements and changes can be added in the coating laminated body according to (I).

(i) The S concentration of the sulfur concentrated layer is 102% or more of an S concentration of the plurality of S-containing Ni alloy coatings.

(ii) Each of the plurality of layers of S-containing Ni alloy coatings has an identical thickness.

(iii) Each of the plurality of layers S-containing Ni alloy coatings has a thickness of 300 nm or more and 1000 nm or less.

(iv) Each of the plurality of layers of S-containing Ni alloy coatings further contains phosphorus.

(v) Each of the plurality of layers of S-containing Ni alloy coatings has an average crystal grain size of 8 nm or less.

(II) According to another aspect of the invention, a method for producing the coating laminated body is provided. The method includes: a nickel alloy coating plating treatment step being performed for a plurality of times; and an annealing treatment step. The step of the annealing treatment is performed at an annealing temperature of 300° C. or less.

According to the invention, the following improvements and changes can be added in the method for producing the coating laminated body according to (II).

(vi) A plating treatment stop step is interposed between the plurality of nickel alloy coating plating treatment steps.

Advantageous Effect

According to the invention, it is possible to provide a coating laminated body in which coatings not containing hexavalent chromium which is an environmental concern material, and excellent in corrosion resistance and wear resistance are laminated on a base material, and to provide a method for producing the same.

DESCRIPTION OF EMBODIMENTS

Hereinafter, embodiments according to the invention are described with reference to the drawings. However, the invention is not limited to the embodiments described here, and can be appropriately combined with known technology or may be modified based on known technology without departing from the technical idea of the invention.

[Coating Laminated Body]

Figure 1:
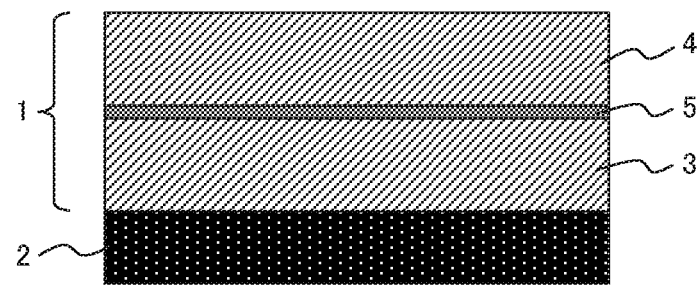
FIG. 1 is a schematic sectional view illustrating an example of a coating laminated body according to the invention.

FIG. 1 is a schematic sectional view illustrating an example of a coating laminated body according to the invention. As illustrate in FIG. 1, in the coating laminated body, a multiple-layer coating 1 is formed on a surface of a base material 2. Here, two layers which are sulfur-containing nickel alloy coating 3 and sulfur-containing nickel alloy coating 4 are laminated in the multiple-layer coating 1. Hereinafter, the "sulfur-containing nickel alloy coating" may be simply referred to as "nickel alloy coating".

The base material 2 on which the multiple-layer coating is formed is not particularly limited, and can be appropriately selected according to applications of the coating laminated body. For example, carbon steel, low alloy steel, stainless steel, copper, aluminum, an alloy thereof, and the like can be appropriately used.

A feature of the coating laminated body of the invention is that, in the multiple-layer coating 1, a sulfur concentrated layer 5 having an S concentration higher than the S concentration of the sulfur-containing nickel alloy coating 3 and the sulfur-containing nickel alloy coating 4 is provided between the adjacent sulfur-containing nickel alloy coating 3 and the sulfur-containing nickel alloy coating 4 (interface region).

The coating laminated body of the invention includes the sulfur concentrated layer 5 having a sacrificial anticorrosive effect between the coatings of the multiple-layer coating 1 (the interface region of the adjacent coatings), so that the pitting corrosion that normally occurs in a coating thickness direction (a direction perpendicular to the coating) in related art can be converted into a coating parallel direction (a direction parallel to the coating), and the corrosion is prevented from reaching the base material 2. In other words, by providing the sulfur concentrated layer 5 as a constituent layer of the multiple-layer coating 1, corrosion resistance of the coating laminated body can be improved.

From a viewpoint of the sacrificial anticorrosive effect, the S concentration of the sulfur concentrated layer 5 is preferably higher than the S concentration of the adjacent sulfur-containing nickel alloy coatings 3, 4, and more specifically, is preferably 102% or more.

In the invention, a Ni concentration in the sulfur-containing nickel alloy coatings 3, 4 that sandwich the sulfur concentrated layer 5 is preferably 90% by mass or more, and a difference in Ni concentrations of the sulfur-containing nickel alloy coating 3 and the sulfur-containing nickel alloy coating 4 is preferably 1% by mass or less.

In this way, hardness of each of the sulfur-containing nickel alloy coatings can be increased equally, and a wear rate of the multiple-layer coating 1 can be uniformly reduced (slower and constant). In other words, by controlling the Ni concentration of each of the sulfur-containing nickel alloy coatings to be 90% or more by mass, and the difference in Ni concentrations between the sulfur-containing nickel alloy coatings to be 1% or less by mass, it is possible to improve wear resistance of the coating laminated body.

In order to increase the hardness of the nickel alloy coating, a metalloid element (for example, phosphorus (P) or boron (B)) may be contained as an alloy component of the nickel alloy. Similarly, in order to increase the hardness of the coating, particles of an oxide (for example, titanium oxide ($TiO_2$), aluminum oxide ($Al_2O_3$)), and particles of carbide (for example, silicon carbide (SiC)) may be dispersed. In consideration of cost and productivity, it is desirable to contain P as a component of the nickel alloy. In this case, a P concentration is preferably to be the same for each of the nickel alloy coatings.

In addition, from a viewpoint of increasing the hardness (that is, from the viewpoint of increasing the wear resistance), each of the nickel alloy coatings preferably has a smaller crystal grain size, and more specifically, an average crystal grain size is preferably 4 nm or more and 8 nm or less, and is more preferably 6 nm or more and 8 nm or less.

Thickness of each of the nickel alloy coatings is preferably 300 nm or more and 1000 nm or less. Further, each of the nickel alloy coatings is preferably made to have an equal thickness (to be equivalent).

Figure 8:
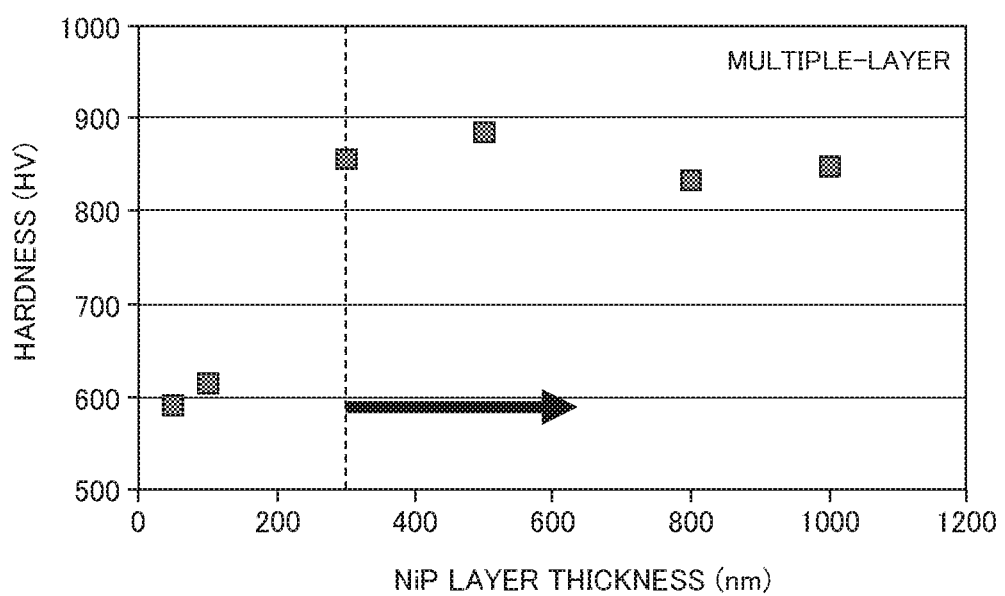
FIG. 8 is a graph illustrating a relationship between a thickness of each NiP layer and the hardness (Vickers hardness) of the multiple-layer coating when the nickel alloy coating (NiP layer in this case) having the same thickness is multilayered.

FIG. 8 is a graph illustrating a relationship between the thickness of each NiP layer and the hardness (Vickers hardness) of the multiple-layer coating when the nickel alloy coating (NiP layer in this case) having the same thickness is multilayered. Each test sample has the sulfur concentrated layer interposed between the NiP layers, and the number of layers is adjusted so that the thickness of the entire multiple-layer coating is about 10 μm.

As illustrated in FIG. 8, it can be seen that the Vickers hardness of the multiple-layer coating 1 is increased to 800 HV or more by setting the thickness of each of the nickel alloy coatings to be in a range of 300 nm or more and 1000 nm or less. That is, the wear resistance can be improved by controlling the thickness of each of the alloy coatings within the range. Further, by unifying the thicknesses of the alloy coatings, it is also possible to expect that production control becomes easy, thereby improving productivity. In respect of a cause of this result, it has not been elucidated at the current stage.

The coating laminated body of the invention can be preferably applied to components or products requiring the corrosion resistance and the wear resistance.

[Method for Producing Coating Laminated Body]

A method for producing the coating laminated body according to the invention will be described. A treatment method such as a wet treatment (for example, electroplating) or a dry treatment (for example, sputtering) can be used as the method for producing the coating laminated body of the invention. Based on a viewpoint of mass productivity, the electroplating is preferable.

An electroplating solution for forming the multiple-layer coating 1 is not particularly limited, and a solution obtained by adding an alloy component and a sulfur-containing organic compound to a Watts bath of which main components are nickel sulfate, nickel chloride, boric acid and the like can be used. For example, when the phosphorus is used as the alloy component, phosphonic acid or the like can be added. Saccharin, sodium lauryl sulfate, allyl sulfonic acid, thiourea and the like, which are well-known brightening agents, can be used as the sulfur-containing organic compound.

By adding the sulfur-containing organic compound to the Watts bath in this manner, the nickel alloy coatings are rigidized and smoothed, so that the wear resistance of the multiple-layer coating 1 is improved. Further, concentrations of various components of the electroplating solution can be appropriately adjusted.

Figure 2:
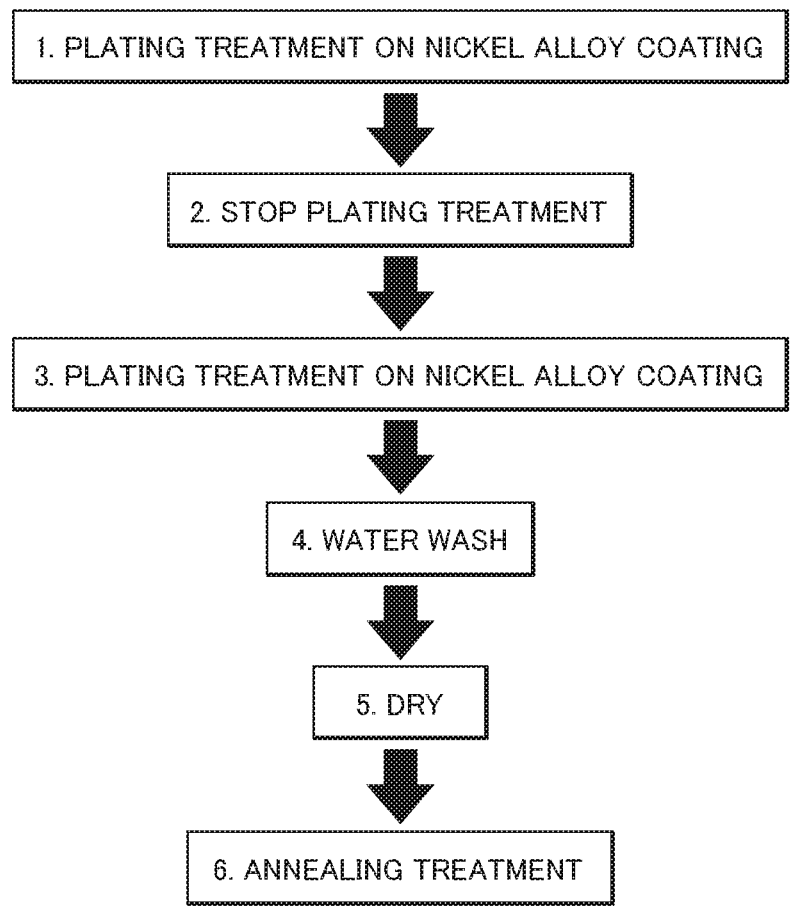
FIG. 2 is a flow chart illustrating an example of a method for producing the coating laminated body according to the invention, and illustrates an electroplating process.

FIG. 2 is a flow chart illustrating an example of the method for producing the coating laminated body according to the invention, and illustrates an electroplating process. As illustrated in FIG. 2, a process of producing the coating laminated body is performed in the following order.

1. Nickel alloy coating 3 plating treatment step
2. Plating treatment stop step
3. Nickel alloy coating 4 plating treatment step
4. Water washing step
5. Drying step
6. Annealing treatment step FIG. 2 describes the multiple-layer coating 1 including two laminated layers of the nickel alloy coating 3 and the nickel alloy coating 4, but the number of layers of the nickel alloy coating can be appropriately set according to specifications such as the corrosion resistance, the wear resistance and lifetime required by the components or the products to which the coating laminated body is applied. In this case, the steps 1 to 3 may be appropriately repeated according to the number of layers of the nickel alloy coating of the multiple-layer coating 1.

In order to exhibit excellent corrosion resistance and excellent wear resistance in the multiple-layer coating 1 of the coating laminated body of the invention, "2. plating treatment stop step" and "6. annealing treatment step" in the above process are important.

In the plating treatment stop step, a stop time of the plating treatment is preferably set to 30 seconds or longer while being immersed in the plating solution. This is a finding obtained from results of intensive studies by the present inventors, and is a time required for sufficiently adsorbing the sulfur-containing organic compound to a surface of the nickel alloy coating 3.

By setting a plating stop time in the plating treatment stop step to 30 seconds or longer, the sulfur concentrated layer 5 can be formed on the surface of the nickel alloy coating 3 (the interface region of the nickel alloy coatings 3, 4 later). Further, it is also confirmed that the hardness of the multiple-layer coating 1 changes depending on the plating stop time.

Figure 3:
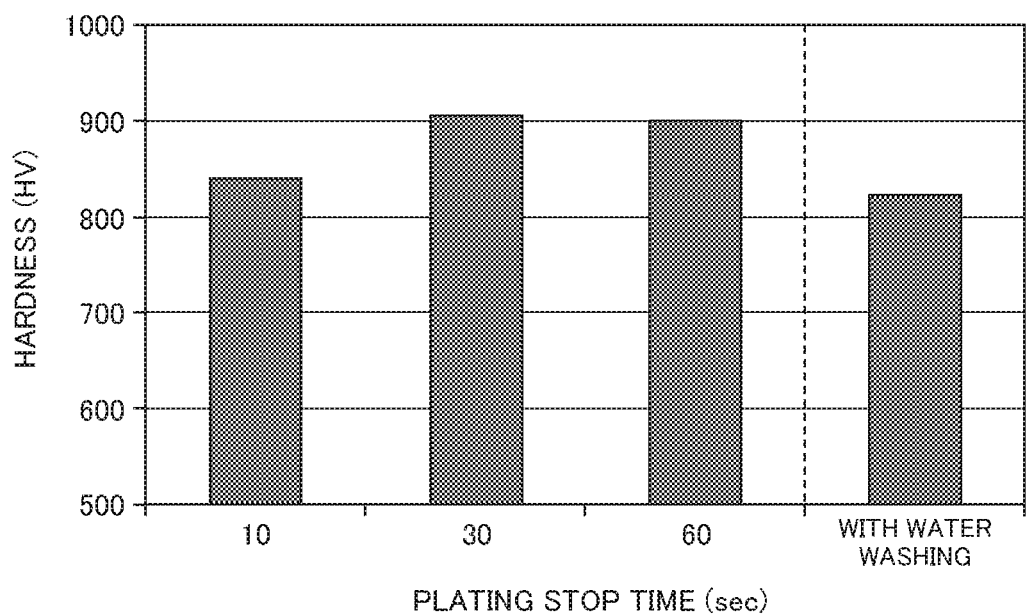
FIG. 3 is a graph illustrating an example of a relationship between a plating stop time in a plating treatment stop step and the hardness (Vickers hardness) of the multiple-layer coating.

FIG. 3 is a graph illustrating an example of a relationship between the plating stop time in the plating treatment stop step and the hardness (Vickers hardness) of the multiple-layer coating. For comparison, when the plating treatment is stopped, an example in which a material to be plated is immediately removed from the plating solution and washed with water (that is, an example in which the plating stop time is 0 second while being immersed in the plating solution) is also shown.

As illustrated in FIG. 3, it is confirmed that the Vickers hardness of the multiple-layer coating 1 is improved by setting the plating stop time to 30 seconds or longer while the material to be plated is kept immersed in the plating solution. Meanwhile, it is confirmed that when the plating treatment is stopped, the Vickers hardness is reduced in a sample (a sample with water washing) in which the material to be plated is immediately removed from the plating solution and washed with water.

An effect of adding a sulfur component to a plating coating is generally known as the sacrificial anticorrosive effect and an effect of smoothing a surface of the plating coating. In addition, in the invention, an effect of improving the Vickers hardness of the multiple-layer coating 1 can be obtained by appropriately forming the sulfur concentrated layer 5.

As one of the causes, it is considered that presence of the sulfur concentrated layer 5 prevents coarsening of crystal grains of the nickel alloy coating in the later annealing treatment step. More specifically, it is considered that the coarsening of the crystal grains of the adjacent nickel alloy coatings 3, 4 is prevented by diffusion and infiltration of the sulfur component from the sulfur concentrated layer 5.

In the annealing treatment step, an annealing temperature is preferably set to 200° C. or more and 300° C. or less. This is a finding obtained from the results of intensive studies by the present inventors. By setting the annealing temperature to 300° C. or less, the average crystal grain size of the nickel alloy coating can be maintained at 8 nm or less. When the annealing temperature is less than 200° C., the hardness of the multiple-layer coating 1 is not sufficiently improved. When the annealing temperature is more than 300° C., the crystal grains of the nickel alloy coating tend to be coarsened, so that the hardness of the multiple-layer coating 1 is reduced. A time of the annealing treatment is not particularly limited, but is preferably, for example, one hour or longer.

Electrolysis conditions, such as current density and processing time, of "1. nickel alloy coating 3 plating treatment step" and "3. nickel alloy coating 4 plating treatment step" may be appropriately adjusted depending on a desired coating thickness, and the conditions are preferably to be identical based on a viewpoint of unifying the thicknesses of the coatings.

If necessary, an impurity removal step such as degreasing or pickling may be performed as a pretreatment of the base material 2 before "1. nickel alloy coating 3 plating treatment step".

As described above, the method for producing the coating laminated body of the invention has advantages of high productivity and simple operation (that is, low cost), since a plurality of the nickel alloy coatings are formed by using one plating bath under the same electrolysis conditions.

In the invention, a shape of the base material 2 (that is, a shape of the coating laminated body) is not particularly limited, and can be applied to components with any shape (for example, a mass, a flat plate, a curved plate, a cylinder, or a prism). However, when the coating is formed by the electroplating, the coating thickness may vary depending on locations caused by influences of current distribution due to the shape of the components (shape of the base material 2). Therefore, it is preferable to perform the electroplating under a condition that various coating thickness due to plating locations can be prevented by, measuring the influences of the current distribution by analysis and actual measurement, and placing a shielding plate or the like between the material to be plated and a counter electrode if necessary.

[Modification of Coating Laminated Body]

Figure 4:
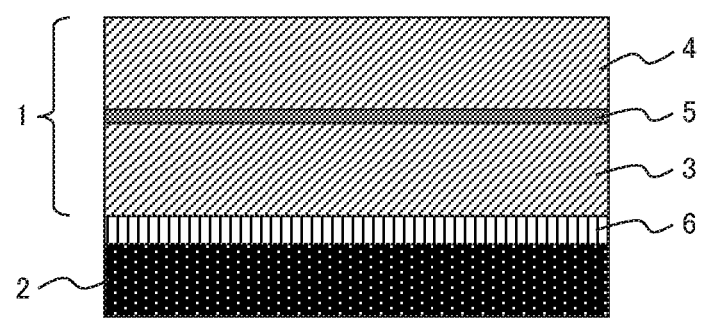
FIG. 4 is a schematic sectional view illustrating another example of the coating laminated body according to the invention.

FIG. 4 is a schematic sectional view illustrating another example of the coating laminated body according to the invention. As illustrated in FIG. 4, in the coating laminated body of the invention, an adhesion layer 6 may be provided between the base material 2 and the sulfur-containing nickel alloy coating 3 according to a type of the base material 2. This is effective when the base material 2 is made of a material that forms a stable oxide coating or the like on the surface thereof.

When the surface of the base material 2 is covered with the chemically stable oxide coating, adhesion of the sulfur-containing nickel alloy coating 3 to the base material 2 tends to be weak. Therefore, it is preferable to improve the adhesion by providing the adhesion layer 6 between the base material 2 and the sulfur-containing nickel alloy coating 3 (that is, on the surface of the base material 2). For example, when the surface, which is stainless steel or the like, of the base material 2 is easily passivated, the adhesion layer 6 can be formed on the surface of the base material 2 by using a wood bath.

EXAMPLES

Hereinafter, specific examples of the invention will be described in more detail with reference to Examples. However, the invention is not limited to the Examples.

Experiment 1

Preparation of Example 1

A steel SS 400 material (50 mm×70 mm×3 mm) with an arithmetic average roughness Ra of 0.05 μm obtained by machine polishing a surface was used as a base material on which a multiple-layer coating is to be formed.

In order to form a sulfur-containing nickel alloy coating, an electroplating solution shown in Table 1 which is based on the Watts bath was used. A target component of the nickel alloy was phosphorus, and phosphonic acid was used. The sulfur-containing organic compound was saccharin.

TABLE 1

| Nickel sulfate | 260 g/l |
|---|---|
| Nickel chloride | 12 g/l |
| Boric acid | 30 g/l |
| Phosphoric acid | 25 g/l |
| Citric acid | Proper quantity |
| Saccharin | Proper quantity |

A process of producing the coating laminated body was performed in an order illustrated in FIG. 2. Specifically, firstly, an impurity removal step of degreasing and pickling was performed as pretreatment on the base material. In the nickel alloy coating plating treatment step, thickness of each coating is 500 nm, and the number of layers was 20 (the number of times of repeating the plating treatment step is 20). That is, the thickness of the entire multiple-layer coating is 10 μm. An electrolytic condition of the plating treatment step is to perform the treatment at a constant current by using a Ni plate as a counter electrode. In the plating treatment stop step between the plating treatment steps, the stop time was set to 30 seconds. In the annealing treatment step, the annealing temperature was set to 300° C. and a holding time was set to 2 hours.

Therefore, the coating laminated body of the Example 1 is produced by the above procedure.

Experiment 2

Preparation of Example 2

A coating laminated body of Example 2 was produced in the same manner as in Experiment 1 except that in the nickel alloy coating plating treatment step, a thickness of each layer of the nickel alloy coating of a multiple-layer coating was 300 nm, and the number of layers was changed to 34. That is, a thickness of the entire multiple-layer coating is 10.2 μm which is substantially the same as that of Example 1.

Experiment 3

Preparation of Example 3

A coating laminated body of Example 3 was produced in the same manner as in Experiment 1 except that in the nickel alloy coating plating treatment step, a thickness of each layer of the nickel alloy coating of a multiple-layer coating was 1000 nm, and the number of layers was changed to 10. That is, a thickness of the entire multiple-layer coating is 10 μm which is the same as in Example 1.

Experiment 4

Preparation of Comparative Example 1

A coating laminated body of Comparative Example 1 is produced in the same manner as in Experiment 1 except that in the nickel alloy coating plating treatment step, a thickness of a nickel alloy coating was 10 μm, and the number of layer was changed to 1. That is, a thickness of the coating formed on a base material is 10 μm which is the same as in Example 1.

Experiment 5

Preparation of Comparative Example 2

A coating laminated body of Comparative Example 2 is produced in the same manner as in Experiment 1 except that in the nickel alloy coating plating treatment step, a thickness of each layer of the nickel alloy coating of a multiple-layer coating was 100 nm, and the number of layers was changed to 100. That is, a thickness of the entire multiple-layer coating is 10 μm which is the same as in Example 1.

Experiment 6

Preparation of Comparative Example 3

A coating laminated body of Comparative Example 3 was produced in the same manner as in Experiment 1 except that in the annealing treatment step, an annealing temperature was changed to 400° C.

Experiment 7

Coating laminated bodies of Examples 1 to 3 and Comparative Examples 1 to 3 were subjected to crystal structure analysis, elemental analysis, hardness measurement, corrosion resistance evaluation, and wear resistance evaluation.

(Crystal Structure Analysis)

Phase identification and crystal grain size measurement for a multiple-layer coating of a coating laminated body were performed by using a wide-angle X-ray diffraction (WXRD) method.

(Elemental Analysis)

Element distribution measurement for the multiple-layer coating of the coating laminated body was performed by using a secondary ion mass spectrometry (SIMS).

(Hardness Measurement)

Hardness measurement for the multiple-layer coating of the coating laminated body was performed by using a Vickers hardness meter. The measurement was performed on a surface of the multiple-layer coating under conditions of a load being 25 gf, and a load holding time being 15 seconds.

(Corrosion Resistance Evaluation)

The corrosion resistance evaluation was performed by a combined cycle test according to JIS K 5600-7-9 "neutral salt water spray cycle test method". In the evaluation method, in order to observe the effect of sacrificial anticorrosive effect, the number of cycles at which a test piece was corroded by 50% or more was used instead of the number of the cycles at a start of the corrosion.

(Wear Resistance Evaluation)

The wear resistance evaluation was performed by using a reciprocating sliding tester. After a counterpart material was slid reciprocally at a predetermined load and a predetermined speed under an unlubricated condition, wear scar of the test piece was measured by a laser microscope, and a wear amount per unit sliding distance (μg/m) was calculated, and a reciprocal (m/μg) thereof was used as an index. As for the sliding conditions, a speed was set to 0.1 m/s, a load was set to 9.8 N, a distance was set to 0.04 m, and the counterpart material was a bearing steel SUJ2 (a sphere diameter of 10 mm).

Results of the crystal structure analyses of Example 1 and Comparative Example 3 are shown in Table 2.

TABLE 2

|  | Ni | Ni$_3$P | Amorphous Ni | Crystal grain size (nm) |
|---|---|---|---|---|
| Example 1 | ○ | — | ○ | 6.0 |
| Comparative Example 3 | ○ | ○ | — | 12.4 |

As shown in Table 2, in Example 1, a crystalline Ni phase and a non-crystalline Ni phase were confirmed, and an average crystal grain size of the crystalline Ni phase was 6.0 nm. On the other hand, in Comparative Example 3, the crystalline Ni phase and a crystalline Ni$_3$P phase were confirmed in the coating laminated body, and the average crystal grain size of the crystalline Ni phase was 12.4 nm.

Figure 5:
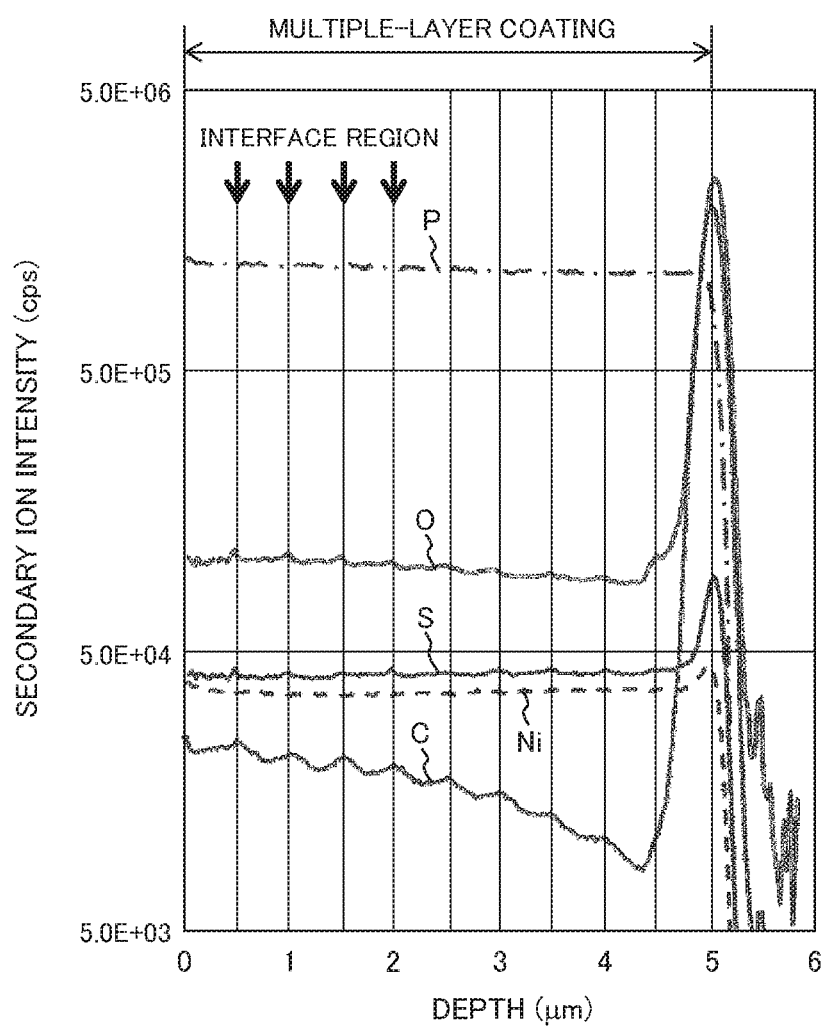
FIG. 5 is a diagram illustrating a result of secondary ion mass spectrometry analysis of the total element distribution in a depth direction of a multiple-layer coating of Example 1.

FIG. 5 is a diagram illustrating a result of secondary ion mass spectrometry analysis of the total element distribution in a depth direction (thickness direction) of the multiple-layer coating of Example 1. Further, FIG. 6 is an enlarged diagram illustrating the result of elemental distribution of sulfur in FIG. 5.

Figure 6:
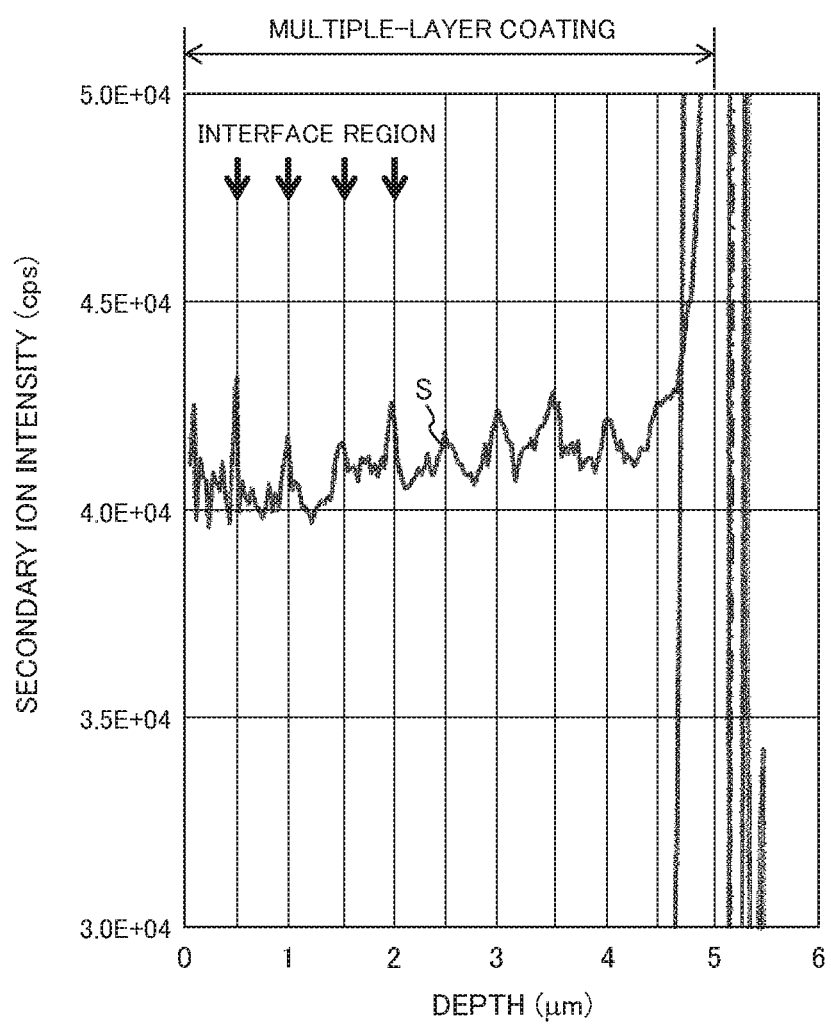
FIG. 6 is an enlarged diagram illustrating the result of elemental distribution of sulfur in FIG. 5.

As illustrated in FIGS. 5 and 6, Ni and P, which are main components, are distributed substantially uniformly in the multiple-layer coating, whereas S presumed to be derived from saccharin has peaks observed in each interface region between the nickel alloy coatings. In addition, C presumed to be derived from saccharin tended to increase from the base material toward the surface of the multiple-layer coating, but was distributed substantially uniformly in the multiple-layer coating.

In respect to component concentration in the multiple-layer coating, Ni concentration was 96 to 97% by mass, and P concentration was 3 to 4% by mass. S concentration was 0.040% by mass in the nickel alloy coating and was 0.041 to 0.043% by mass in the interface region.

Based on the crystal structure analysis and the elemental analysis, it was confirmed that the multiple-layer coating of the coating laminated body of Example 1 had an average crystal grain size of 6.0 nm, the Ni concentration is 96% or more by mass in each nickel alloy coating, and a difference in Ni concentration between the coatings is 1% or less by mass. Further, it was confirmed that the S concentration at the interface region between the two adjacent nickel alloy coatings is 102% or more of the S concentration contained in the nickel alloy coatings that sandwich the interface region.

Figure 7:
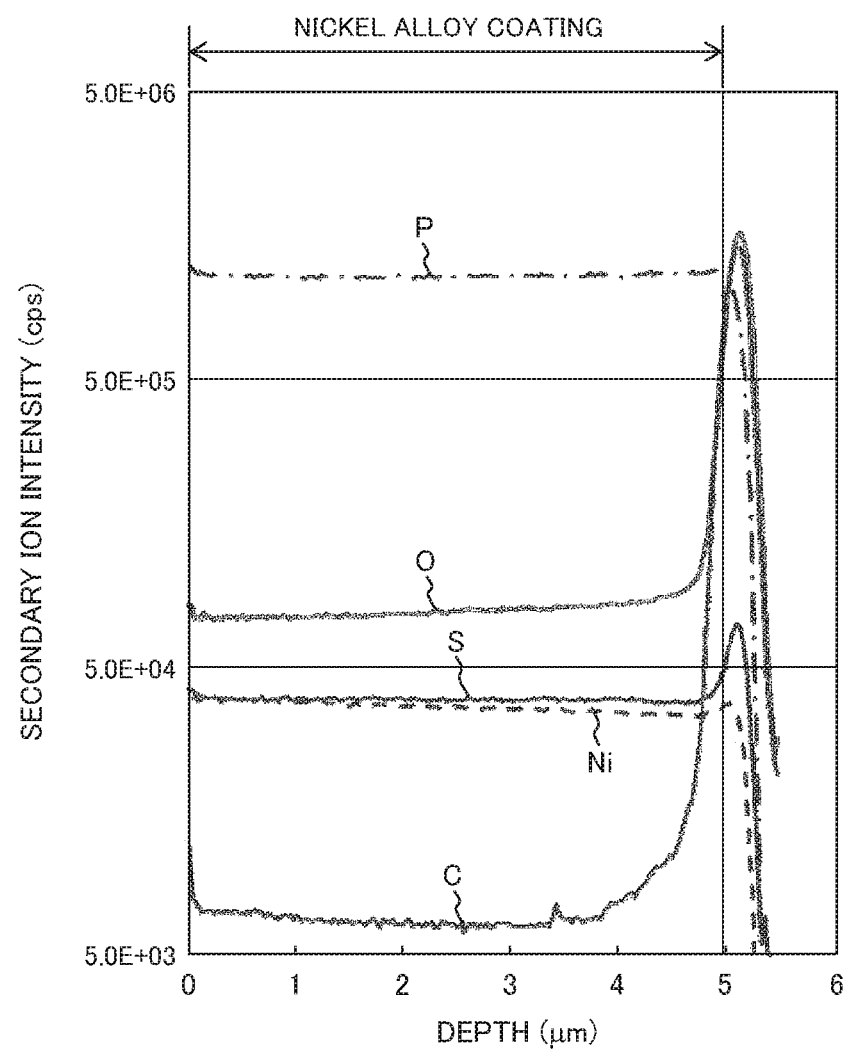
FIG. 7 is a diagram illustrating a result of secondary ion mass spectrometry analysis of the total element distribution in a depth direction of a nickel alloy coating of Comparative Example 1.

FIG. 7 is a diagram illustrating a result of secondary ion mass spectrometry analysis of the total element distribution in the depth direction (thickness direction) of the nickel alloy coatings of Comparative Example 1. As illustrated in FIG. 7, in addition to Ni and P which are the main components, S and C presumed to be derived from the saccharin are also substantially uniformly distributed in the nickel alloy coatings. Although not being illustrated in drawings, the peak was not particularly confirmed even when the elemental distribution of the sulfur is enlarged. This is considered to be due to the fact that only one layer of the nickel alloy coating having a thickness of 10 μm is formed.

In respect to the component concentrations in the nickel alloy coating, the Ni concentration was 96 to 97% by mass, the P concentration was 3 to 4% by mass, and the S concentration was 0.040% by mass.

The results of the hardness measurement, the corrosion resistance evaluation, and the wear resistance evaluation of Examples 1 to 3 and Comparative Examples 1 to 3 are shown in Table 3.

TABLE 3

|  | Hardness (HV) | Corrosion resistance (cycle) | Wear resistance (m/μg) |
|---|---|---|---|
| Example 1 | 885 | 42 | 4.32 |
| Example 2 | 858 | 42 | 3.52 |
| Example 3 | 849 | 42 | 4.08 |
| Comparative Example 1 | 800 | 33 | 1.61 |
| Comparative Example 2 | 617 | 36 | 0.88 |
| Comparative Example 3 | 644 | 40 | 1.27 |

As shown in Table 3, in Example 1, the hardness was 885 HV, the corrosion resistance was 42 cycles, and the wear resistance was 4.32 m/μg. In Example 2, the hardness was 858 HV, the corrosion resistance was 42 cycles, and the wear resistance was 3.52 m/μg. In Example 3, the hardness was 849 HV, the corrosion resistance was 42 cycles, and the wear resistance was 4.08 m/μg. That is, it was confirmed that all of Examples 1 to 3 exhibited high hardness, good corrosion resistance and good wear resistance.

Further, it was confirmed that when the thickness of each nickel alloy coating is in a range of 300 to 1000 nm, equivalent properties (hardness, corrosion resistance, and wear resistance) were obtained.

Compared with Examples 1 to 3, Comparative Example 1 had a hardness of 800 HV, a corrosion resistance of 33 cycles, and a wear resistance of 1.61 m/µg. It was confirmed that, compared with Example 1, Comparative Example 1 in which the coating formed on the base material was one layer of nickel alloy coating, was decreased in the hardness, the corrosion resistance and the wear resistance were. In particular, as can be seen from the elemental analysis result in FIG. 7, it is considered that the reason of reduced corrosion resistance was that since the nickel alloy coating was a single layer, an a sulfur concentrated layer was not formed between alloy coatings, and therefore the sacrificial anticorrosive effect did not work, and pitting corrosion easily spread to the base material.

Comparative Example 2 had a hardness of 617 HV, a corrosion resistance of 36 cycles, and a wear resistance of 0.88 m/µg. It was confirmed that, compared with Example 1, Comparative Example 2 in which the thickness of each nickel alloy coating of the multiple-layer coating was set to 100 nm, was particularly decreased in the hardness and the wear resistance. It is considered that the decrease in the hardness and the wear resistance is due to the thickness of each layer of the nickel alloy coatings. In other words, based on the comparison of Examples 1 to 3 and Comparative Example 1, it was confirmed that in order to obtain excellent hardness and excellent wear resistance, it was important to control the thickness of each layer of the nickel alloy coatings to 300 to 1000 nm.

Comparative Example 3 had a hardness of 644 HV, a corrosion resistance of 40 cycles and a wear resistance of 1.27 m/µg. It is confirmed that, compared with Example 1, Comparative Example 3 in which the annealing temperature of the annealing treatment step was set to 400° C., is particularly decreased in the hardness and the wear resistance. It is considered that the decrease in the hardness and the wear resistance is caused by the coarsening of Ni phase crystal grains based on the results of crystal structure analysis in Table 2. In other words, based on the comparison with Example 1, it was confirmed that in order to obtain excellent hardness and excellent wear resistance, it was important to control the average crystal grain size of the Ni phase to 8 nm or less.

The embodiments and examples described above have been described to aid the understanding of the present invention, and the present invention is not limited to the specific configurations described. For example, part of the configuration of the embodiment can be replaced with the configuration of the common technical knowledge of the person skilled in the art, and the configuration of the technical knowledge of the person skilled in the art can be added to the configuration of the embodiment. In other words, the present invention can be deleted or replaced with another configuration or added with another configuration without departing from the technical idea of the invention as to a part of the configurations of the embodiments and examples of the present specification.

REFERENCE SIGN LIST

1: Multiple-layer coating
2: Base material
3, 4: Sulfur-containing nickel alloy coating
5: Sulfur concentrated layer
6: Adhesion layer

The invention claimed is:

1. A coating laminated body comprising:
a base material; and
a multiple-layer coating laminated on the base material, wherein
the multiple-layer coating includes a plurality of layers of sulfur-containing nickel alloy coatings; and a sulfur concentrated layer that is formed between each of the plurality of layers of sulfur-containing nickel alloy coatings, and has a sulfur concentration higher than a sulfur concentration of the sulfur-containing nickel alloy coatings,
each of the plurality of layers of sulfur-containing nickel alloy coatings has a nickel concentration of 90% or more by mass and has a thickness of 300 nm or more and 1000 nm or less, and a difference in the nickel concentration between the sulfur-containing nickel alloy coatings is within 1% by mass,
the multiple-layer coating has a Vickers hardness of 800 HV or more, and
the plurality of layers of sulfur-containing nickel alloy coatings is 10 layers or more.

2. The coating laminated body according to claim 1, wherein
the sulfur concentration of the sulfur concentrated layer is 102% or more of the sulfur concentration of the plurality of sulfur-containing nickel alloy coatings.

3. The coating laminated body according to claim 1, wherein
each of the plurality of layers of sulfur-containing nickel alloy coatings has an identical thickness.

4. The coating laminated body according to claim 1, wherein
each of the plurality of layers of sulfur-containing nickel alloy coatings further contains phosphorus.

5. The coating laminated body according to claim 1, wherein
each of the plurality of layers of sulfur-containing nickel alloy coatings has an average crystal grain size of 8 nm or less.

6. A method for producing the coating laminated body according to claim 1, comprising:
a nickel alloy coating plating treatment step being performed for a plurality of times; and
an annealing treatment step,
wherein a plating treatment stop step is interposed between the plurality of nickel alloy coating plating treatment steps, both of the nickel alloy coating plating treatment step and the plating treatment stop step being conducted by using a single kind of plating solution, and
wherein the annealing treatment step is performed at an annealing temperature of 300° C. or less.

7. A coating laminated body according to claim 1, comprising:
a base material; and
a multiple-layer coating laminated on the base material, wherein
the multiple-layer coating includes a plurality of layers of sulfur-containing nickel alloy coatings; and a sulfur concentrated layer that is formed between each of the plurality of layers of sulfur-containing nickel alloy coatings, and has a sulfur concentration higher than a sulfur concentration of the sulfur-containing nickel alloy coatings,
each of the plurality of layers of sulfur-containing nickel alloy coatings has a nickel concentration of 90% or more by mass and has a thickness of 300 nm or more and 1000 nm or less, and a difference in the nickel concentration between the sulfur-containing nickel alloy coatings is within 1% by mass, and wherein the multiple-layer coating has a Vickers hardness of 849 HV or more, and the multiple-layer coating has a wear resistance of 3.52 m/μg or more.

8. A coating laminated body comprising:

a base material; and a multiple-layer coating laminated on the base material, wherein the multiple-layer coating includes a plurality of layers of sulfur-containing nickel alloy coatings; and a sulfur concentrated layer that is formed between each of the plurality of layers of sulfur-containing nickel alloy coatings, and has a sulfur concentration higher than a sulfur concentration of the sulfur-containing nickel alloy coatings, each of the plurality of layers of sulfur-containing nickel alloy coatings has a nickel concentration of 90% or more by mass and has a thickness of 300 nm or more and 1000 nm or less, and a difference in the nickel concentration between the sulfur-containing nickel alloy coatings is within 1% by mass, the multiple-layer coating has a Vickers hardness of 800 HV or more, and wherein the sulfur concentrated layer is a layer of sulfur-containing organic compound.

9. The coating laminated body according to claim 1, wherein an adhesion layer is provided between the base material and the sulfur-containing nickel alloy coating.

\* \* \* \* \*